(12) United States Patent
Chheda et al.

(10) Patent No.: US 7,120,447 B1
(45) Date of Patent: Oct. 10, 2006

(54) SELECTABLE MODE VOCODER MANAGEMENT ALGORITHM FOR CDMA BASED NETWORKS

(75) Inventors: Ashvin Chheda, Plano, TX (US); James Weisert, Calgary (CA); Andy McGregor, Kanata (CA)

(73) Assignee: Nortel Networks Limited, St. Laurent (CA)

(*) Notice: Subject to any disclaimer, the term of this patent is extended or adjusted under 35 U.S.C. 154(b) by 434 days.

(21) Appl. No.: 10/404,753

(22) Filed: Apr. 1, 2003

Related U.S. Application Data

(60) Provisional application No. 60/449,954, filed on Feb. 24, 2003.

(51) Int. Cl.
*H04Q 7/20* (2006.01)
*H04B 15/00* (2006.01)
*H04B 17/00* (2006.01)

(52) U.S. Cl. .................. 455/453; 455/422.1; 455/62
(58) Field of Classification Search ............... 455/453, 455/422.1, 62, 63, 33.2
See application file for complete search history.

(56) References Cited

U.S. PATENT DOCUMENTS

| | | | | |
|---|---|---|---|---|
| 4,963,839 A * | 10/1990 | Stacey | ............ | 331/17 |
| 5,115,429 A * | 5/1992 | Hluchyj et al. | ............ | 370/231 |
| 5,319,583 A * | 6/1994 | Wildes | ............ | 708/303 |
| 5,341,456 A * | 8/1994 | DeJaco | ............ | 704/214 |
| 5,414,796 A * | 5/1995 | Jacobs et al. | ............ | 704/221 |
| 5,550,738 A * | 8/1996 | Bailey et al. | ............ | 455/456.5 |
| 5,649,299 A * | 7/1997 | Battin et al. | ............ | 455/62 |
| 5,734,967 A * | 3/1998 | Kotzin et al. | ............ | 455/63.1 |
| 5,778,338 A * | 7/1998 | Jacobs et al. | ............ | 704/223 |
| 5,946,104 A * | 8/1999 | Yoshida | ............ | 358/412 |
| 5,974,106 A * | 10/1999 | Dupont et al. | ............ | 375/377 |
| 6,014,568 A * | 1/2000 | Alperovich et al. | ............ | 455/456.3 |
| 6,023,453 A * | 2/2000 | Ruutu et al. | ............ | 370/229 |
| 6,219,713 B1 * | 4/2001 | Ruutu et al. | ............ | 709/235 |
| 6,295,453 B1 * | 9/2001 | Desgagne et al. | ............ | 455/448 |
| 6,456,850 B1 * | 9/2002 | Kim et al. | ............ | 455/453 |
| 6,463,274 B1 * | 10/2002 | Robertson | ............ | 455/406 |
| 6,501,736 B1 * | 12/2002 | Smolik et al. | ............ | 370/252 |
| 6,529,730 B1 * | 3/2003 | Komaili et al. | ............ | 455/452.2 |
| 6,714,694 B1 * | 3/2004 | Marshall | ............ | 382/307 |
| 6,745,012 B1 * | 6/2004 | Ton et al. | ............ | 455/67.13 |
| 6,873,597 B1 * | 3/2005 | King | ............ | 370/235 |
| 6,928,268 B1 * | 8/2005 | Kroner | ............ | 455/69 |
| 2001/0012778 A1 * | 8/2001 | Eriksson et al. | ............ | 455/436 |
| 2002/0034170 A1 * | 3/2002 | Tiedemann et al. | ............ | 370/335 |
| 2002/0173315 A1 * | 11/2002 | Chmaytelli et al. | ............ | 455/453 |
| 2003/0103470 A1 * | 6/2003 | Yafuso | ............ | 370/282 |

(Continued)

*Primary Examiner*—Wing Chan
*Assistant Examiner*—Aamir Haq
(74) *Attorney, Agent, or Firm*—Garlick Harrison & Markison; James A. Harrison

(57) ABSTRACT

A method and apparatus to dynamically control selectable vocoder rates in a CDMA network to optimally improve forward and reverse link capacity as necessary. To improve capacity, a number of vocoder rates are used, each requiring a different average data rate and providing a different level of voice quality. Vocoder rates are reduced to lower sector average output power thereby improving forward and reverse link capacity. Forward and reverse link loading are compared to established thresholds that, if exceeded, would trigger a forward link and a reverse link vocoder rate adjustment as necessary to improve network capacity. The forward link vocoder rate and reverse link vocoder rate may be set independently or the reverse link vocoder rate may be set as a function of the forward link vocoder rate to maintain a link balance.

22 Claims, 7 Drawing Sheets

U.S. PATENT DOCUMENTS

2003/0198183 A1* 10/2003 Henriques et al. .......... 370/229
2004/0202136 A1* 10/2004 Attar et al. ................. 370/333
2004/0259560 A1* 12/2004 Hosein et al. ........... 455/452.1

* cited by examiner

SELECTABLE MODE VOCODER MANAGEMENT ALGORITHM FOR CDMA BASED NETWORKS

CROSS REFERENCE TO RELATED APPLICATION

This application claims priority to U.S. Provisional Application Ser. No. 60/449,954, filed Feb. 24, 2003, which is incorporated herein by reference in its entirety for all purposes.

TECHNICAL FIELD OF THE INVENTION

The present invention relates generally to communication systems and particularly to vocoder mode control in a code division multiple access (CDMA) communication system.

DESCRIPTION OF RELATED ART

The Federal Communications Commission (FCC) governs the use of the radio frequency (RF) spectrum, deciding which industry gets certain frequencies. Since the RF spectrum is limited only a small portion of the spectrum can be assigned to each industry. The assigned spectrum, therefore, must be used efficiently in order to allow as many frequency users as possible to have access to the spectrum.

Multiple access modulation techniques are some of the most efficient techniques for utilizing the RF spectrum. Examples of such modulation techniques include time division multiple access (TDMA), frequency division multiple access (FDMA), and code division multiple access (CDMA). CDMA modulation employs a spread spectrum technique for the transmission of information. A spread spectrum system uses a modulation technique that spreads a transmitted signal over a wide frequency band. This frequency band is typically substantially wider than the minimum bandwidth required for transmitting the signal. The spread spectrum technique is accomplished by modulating each baseband data signal to be transmitted with a unique wideband spreading code. Using this technique, a signal having the bandwidth of only a few kilohertz can be spread over a bandwidth of more than a megahertz.

A form of frequency diversity is obtained by spreading the transmitted signal over a wide frequency range. Since only 200–300 kHz of a signal is typically affected by a frequency selected fade, the remaining spectrum of the transmitted signal is unaffected. A receiver that receives the spread spectrum signal, therefore, will be affected less by the fade condition. In addition, such a system has good performance in cases where interference may occupy a narrow-band. In a CDMA-type radiotelephone system, multiple signals are transmitted simultaneously at the same frequency. A particular receiver then determines which signal was intended for that receiver by a unique spreading code in the signal. The signals at that frequency, without the particular spreading code intended for the particular receiver, appear as high frequency noise to that receiver, which can be almost completely eliminated by a low pass filter.

Because CDMA networks employ a system in which all transmissions occur in the same frequency band, it is well known that it is important to transmit at the lowest possible power that allows for the delivery of a communication signal at a certain quality level or grade of service criteria. The reason that it is important for base stations and mobile stations to transmit with a minimal level of power, on the forward and reverse links, is that each transmission adds to the noise level for all other receivers. In addition, if the per user power on the forward link is minimized there is more power available at the sector power amplifier for other users, thereby increasing the capacity of the system. Similarly, on the reverse link, if less power is used, apart from the interference benefits mentioned above, the mobile station can extend its battery life and/or range of transmission.

The number of mobile users continues to grow, thus increasing power demands on the communications network. Network traffic is cyclic with peak time of day power demands. It is not as economically feasible to add physical resources such as extra cell sites, additional frequency carriers, to handle the peak power demands since the these additional system resources would be underutilized during off peak times. Communication network designers plan for network capacity that has an acceptable level of call blocking during peak periods.

If network traffic continues to increase, per-user transmitter output power levels must be reduced to maintain the acceptable level of call blocking. Reducing voice quality will reduce transmitter output power levels thereby increasing network capacity. Although reducing voice quality below a minimum level is unacceptable from a user's perspective, improving voice quality beyond a certain point does little to improve the user's perception of quality, but would greatly increase transmitter output power levels, thereby reducing network capacity.

A selectable mode vocoder (SMV) may be used to increase capacity by degrading voice quality and consequently decreasing associated transmitter output power levels. As SMV vocoder modes are adjusted from premium modes to non-premium modes, the frame sub-rates are lowered, the duty cycle of transmitted frames is reduced thereby reducing average transmitter output power. As the average sector output power in the system increases, call blocking rates increase. Accordingly, by degrading voice quality, network capacity increases and the call blocking rate decreases. While it is known that non-premium SMV modes reduces transmitter output power levels and therefore increase capacity, no designs have yet been introduced that propose a method and logic for dynamically controlling the various SMV modes.

A need exists, therefore, to dynamically adjust vocoder rates based on system load metrics.

BRIEF SUMMARY OF THE INVENTION

A method and apparatus for dynamically controlling selectable voice coder (vocoder) rates of the present invention substantially meets these needs and others. Dynamic control of vocoder rates in a CDMA network optimally uses existing system resources to achieve required forward and reverse link capacity by using a number of vocoder rates, each requiring a different average data rate and providing a different level of voice quality. As more mobile stations enter the network and network traffic increases, forward link loading and reverse link loading increase until either the forward link capacity and/or reverse link capacity/coverage limits are reached. At this point, vocoder rates are reduced to lower sector average output power thereby improving forward and reverse link capacity.

A vocoder operating according to the present invention converts an analog audio signal into a digital audio signal and then compresses 20 ms of 8000 Hz digital audio signal into different size output frames according to a selected vocoder rate. A number of vocoder rates are used, each requiring a different average data rate and providing a different level of voice quality. A higher fraction of lower rate output frames reduce the information duty cycle thereby reducing transmitter output power while lowering the quality of the audio signal. Thus, network capacity can be maintained by dynamically controlling the vocoder rate.

Forward link loading is a measure of the ratio of sector average output power to total or maximum sector output power rating. Forward link loading in a sector is measured and updated periodically and compared to a specified threshold. When the specified threshold is exceeded, the forward link vocoder rate will be reduced to lower data frame duty cycles which lowers transmitter output power. The forward link vocoder rate is adjusted according to whether a mobile station is establishing a call, is in handoff, or is in an existing call. Evaluating the mobile station's location relative to a base transceiver station is considered when deciding to reduce the vocoder rate in one embodiment of the invention. In an alternate embodiment, evaluating the mobile station's subscriber profile for a quality of service rating, i.e., premium vocoder rate, is also used in the decision to adjust the vocoder rate. For instance, some premium subscribers may never be granted a non-premium vocoder rate.

The present invention further includes a method and apparatus for adjusting a reverse link vocoder rate. In one embodiment, the reverse link vocoder rate is set as a function of the forward link vocoder rate. In an alternate embodiment, the reverse link vocoder rate is set according to a Rise-over-thermal (ROT) value. ROT is a measure of reverse link loading. As traffic on the reverse link increases, background noise or multiple access interference rises above the thermal noise floor. The ROT is periodically measured and updated, therefore, and the reverse link vocoder rate is reduced when the ROT exceeds a specified threshold.

The filters used to measure and update the forward link and reverse link loading can be of different types. For instance, a simple sliding window method may be used, or more complex IIR/FIR (infinite impulse and finite impulse response) filtering may be used in processing the samples of forward/reverse link loading.

DETAILED DESCRIPTION OF THE INVENTION

Figure 1:
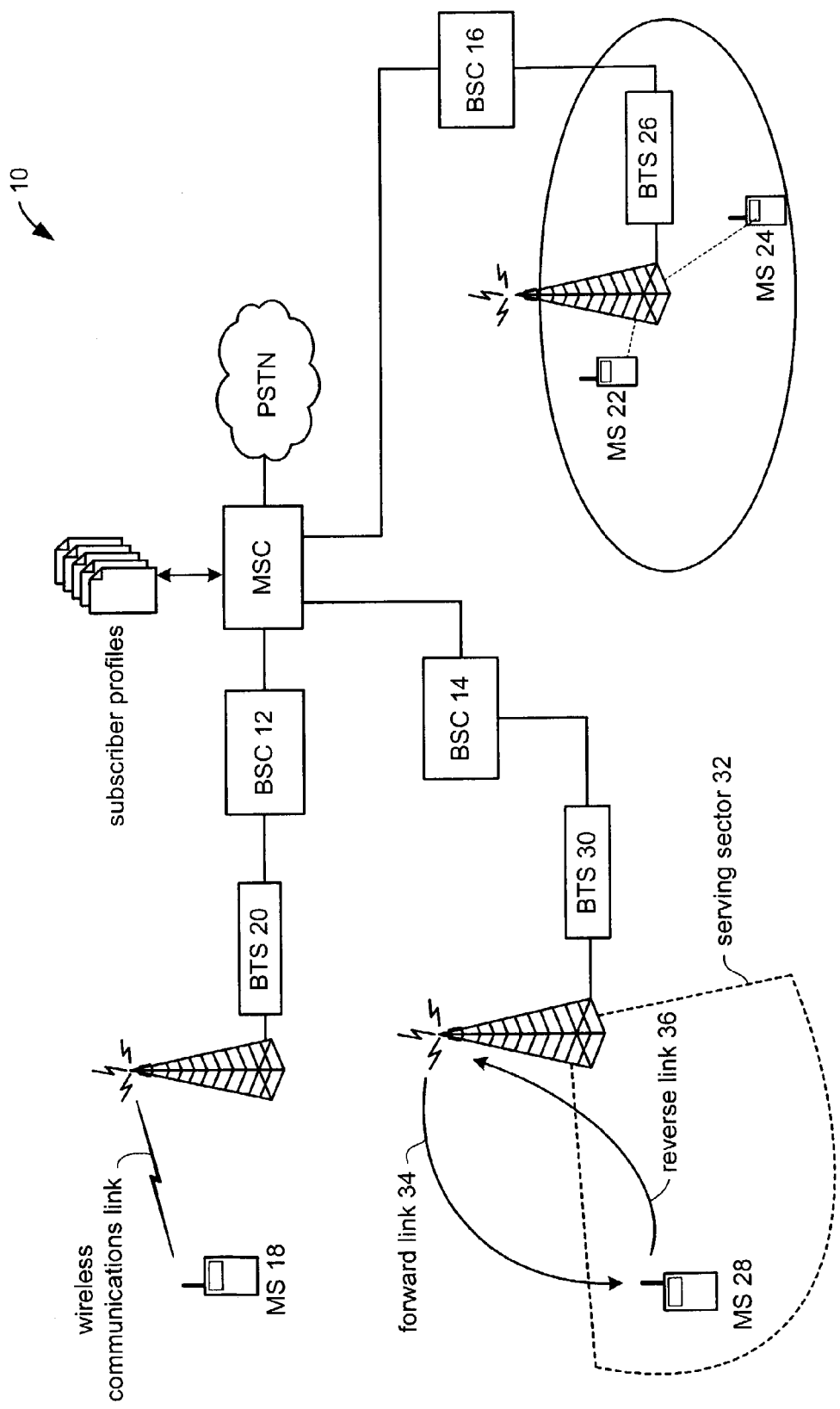
FIG. 1 is a functional block diagram of a partial communication network formed according to one embodiment of the present invention.

FIG. 1 is a functional block diagram of a partial communication network formed according to one embodiment of the present invention. As may be seen, the partial communication network, shown generally at 10, includes many elements that are coupled to operatively communicate with each other. Communication network 10 creates an ability for a mobile station (MS) operating in a code division multiple access (CDMA) network to communicate with other mobile stations or other networks, the Public Switched Telephone Network (PSTN) for example, through a wireless communication link. Mobile stations connect to the communication network through a base station transceiver subsystem (BTS) controlled by a base station controller (BSC). A mobile switching center (MSC) provides services and coordination between the mobile stations in the network and an external network such as the PSTN.

In the example of FIG. 1, the MSC is shown controlling three BSCs, namely, BSC 12, BSC 14, and BSC 16, even though multiple MSCs would typically be used in a communication network. MS 18 is communicating with the network through BTS 20 and BSC 12 over a wireless communication link. As more mobile stations enter the cell covered by BTS 20, a sector or multiple sectors within the cell may exceed a call-blocking threshold thereby jeopardizing service. Accordingly, the present invention provides for reducing network vocoder rates in response to sector loading. Since sector loading is dynamic and transmission power spikes may occur, the sector loading is averaged or samples are passed through a IIR or FIR filter. In one embodiment of the invention, the sector loading is averaged over a specified period of time to create a sliding window average wherein the window size or length is variable. Using a sliding window average reduces the system workload by damping out the power spikes, thus reducing the frequency of vocoder rate changes.

In an alternate embodiment, vocoder rates are adjusted by establishing loading thresholds that trigger a vocoder upgrade or downgrade when forward link loading or average BTS power usage crosses the loading threshold. The number of loading thresholds needed depends on the number of vocoder rates used. For example, if two vocoder rates are used (mode 0 and mode 1) then two loading thresholds (high and low) are defined. If the loading is in an upward trend and crosses the defined high threshold then the vocoder rate is downgraded. Similarly, if the loading is in a downward trend and crosses the low threshold then the vocoder rate is upgraded. Systems requiring a third vocoder rate (mode 2) will need an additional high and low threshold to control the change from mode 2 to mode 1 or mode 0.

A specified period is defined wherein the loading must exceed the loading threshold for the specified period of time before triggering the vocoder rate change. The specified period is used to help reduce frequent vocoder rate changes due to rapid link loading transients. In one embodiment, one timer and one specified period are used for all of the loading thresholds. Separate timers for the various thresholds are used in an alternate embodiment. In one particular embodiment, separate timers are maintained for both high thresholds and low thresholds and, based on system design, are not equal.

Vocoders generally convert an analog audio signal into a digital audio signal by sampling the audio signal to create a series of digital values that represent the audio signal. Higher sampling rates generate more data, which results in better quality audio when converted back to the analog domain. More data, however, requires more bandwidth and more power. Typically, a vocoder converts audio into the digital domain with high resolution and then compress digital audio into different payload sized frames to reduce the amount of data and associated power according to the selected vocoder rate. For example, a vocoder can compress 20 ms of 8000 Hz digital audio signal into different sub-rate output frames according to a selected vocoder rate. A smaller rate output frame reduces data density and reduces transmitter output power while lowering the quality of the audio signal. Thus, network capacity can be maintained by dynamically controlling the vocoder rate.

In order to maintain network capacity, BSC 12 downgrades voice quality by reducing a forward link vocoder rate from a first rate to a second rate thereby reducing transmitter output power in heavily loaded sectors when a loading threshold value is exceeded. BSC 12 evaluates a number of factors to determine if the forward link vocoder rate should be changed. The factors include whether the mobile station is in an existing call, whether the mobile station is establishing a new call, whether the mobile station is attempting handoff, and by evaluating, in one embodiment, subscriber profiles. BSC 12 obtains subscriber profile information typically stored in a home location register formed within or attached to an MSC. The MSC typically delivers the profile information at the time of call set-up. Alternatively, it may be delivered upon demand. The subscriber profile contains, among other data, a quality of service rating in one embodiment. In a three level subscription system, the lowest level will be downgraded first. If the sector loading remains above the loading threshold value, then the BSC will next downgrade the medium level subscribers. Premium subscribers will be the last to be downgraded or may only be downgraded to a set level, i.e. the vocoder mode selection set is limited for premium subscribers.

As an alternative method, the BSC may choose to leave all existing calls at the current rate and assign new calls the reduced forward link vocoder rate. Another alternative is to reduce the forward link vocoder rate based on mobile station location. For example, MS 22 and MS 24 are in a cell controlled by BSC 16 through BTS 26. MS 22 is proximately close to BTS 26 so it uses minimal power. Reducing the forward link vocoder rate would achieve little, if any, power savings. MS 24, however, is relatively close to the cell outer boundary and requires near maximum power from BTS 26 so reducing the forward link vocoder rate will reduce BTS 26 transmitter output power measurably.

Reverse link vocoder rates may be reduced as well. The mobile station performs the reverse link voice encoding so the BSC uses control messages to command the mobile station to change vocoder rates. The reverse link vocoder rates may be set independently of the forward link vocoder rate or may be a function of the forward link vocoder rate. Independent reverse link vocoder rates are based, in part, on a rise-over-thermal (ROT) value measured by the BTS. Rise-over-thermal is a measure of the increase in multiple access power density level (generated by wireless communications) over the ambient thermal noise floor and is, therefore, a measure of reverse link loading. As shown in FIG. 1, MS 28 is in communication with BTS 30, which measures ROT for serving sector 32. As more mobile stations enter serving sector 32 or adjacent sectors, ROT, as measured by BTS 30, will increase to a determined ROT threshold at which BSC 14, through the BTS 30, will command MS 28 to reduce its reverse link vocoder rate. Rather than relying on ROT, BSC 14 may set the reverse link vocoder rate as a function of the forward link vocoder rate. For example, forward link 34 and reverse link 36 may be at a first vocoder rate. If the forward link vocoder link is downgraded to a second rate, then the reverse link will be downgraded to a third rate.

While the preferred embodiment is directed toward CDMA based networks, the principle of dynamically trading off voice quality for system capacity can be applied to Universal Mobile Telecommunications Systems (UMTS) technology as well. UMTS is the next generation of Global System for Mobile Communications (GSM) wireless standards. UMTS uses an Adaptive Multi-Rate (AMR) speech coder-decoder (codec) to perform speech coding using a plurality of compression levels. The AMR compression level can be reduced to balance voice quality with system capacity.

Figure 2:
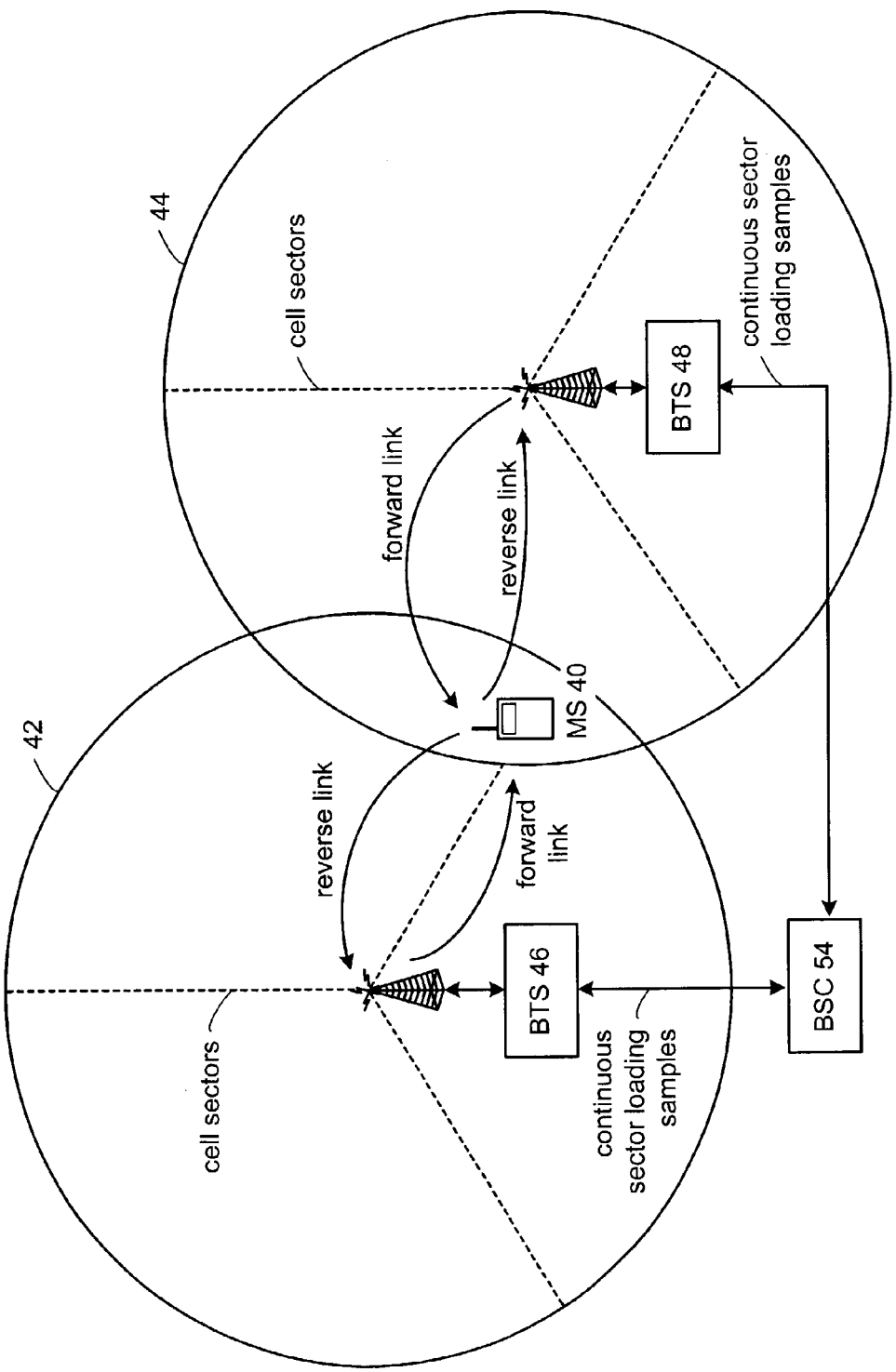
FIG. 2 is a functional block diagram of a mobile station in handoff.

FIG. 2 is a functional block diagram of a mobile station in two-way handoff. MS 40 is in an area where coverage from cell 42 and cell 44 overlap so that it receives an adequate pilot channel signal from a sector in each cell. In the example of FIG. 2, MS 40 is in handoff between two cell sectors of cell 42 and one cell sector of cell 44. Cell 42 is controlled by BTS 46 while cell 44 is controlled by BTS 48. Each BTS measures continuous sector loading samples for each cell sector, averaged over a two-second interval, for blocking purposes and stores them in a shift register as will be described below. It is understood, of course, that the interval may be varied in length and need not be two seconds long. The contents of the shift register are used to generate average sector loading for a specified period of time. BTS 46 generates continuous sector loading samples for the sectors communicating with MS 40. Similarly, BTS 48 generates continuous sector loading samples for the sector communicating with MS 40. BSC 54 uses the continuous sector loading samples, generated by both BTS 46 and BTS 48, to calculate average sector loading for each cell sector, and assigns a reduced forward link vocoder rate as a function of the cell sector with the highest average sector loading. In the event that the handoff for MS 40 completely transitions to the sector with the highest average sector loading, the impact to the capacity of that sector is reduced by selecting a vocoder rate that is a function of the average sector loading therein. In the event of the handoff transitioning completely to a sector with lower average sector loading, the vocoder rate can be upgraded using metrics as described herein.

Figure 3:
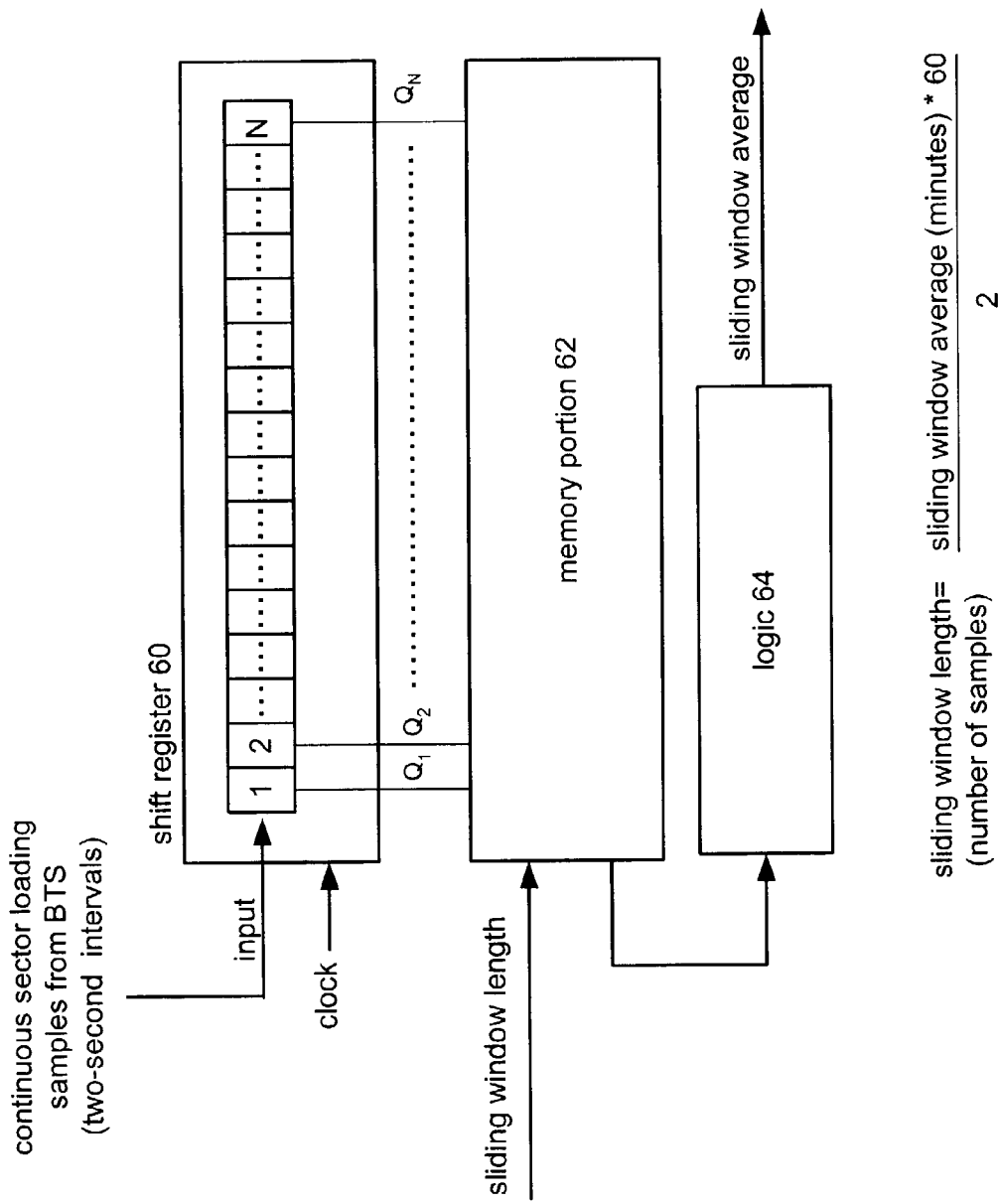
FIG. 3 is a schematic block diagram of a shift register used to generate a sliding window average.

FIG. 3 is a schematic block diagram of a shift register used in the generation of a sliding window average. Continuous sector loading samples generated (over a two-second interval) by a BTS are coupled to the input of shift register 60. The shift register is a sequence of flip-flops coupled in series with the output of one flip-flop coupled to the input of the next flip-flop. Memory cells as well as other equivalent devices, however, may readily be used in place of the flip-flops. As each new continuous sector loading sample is generated, it is shifted into a first position coincident with a clock signal as the contents of the shift register are shifted to a next position. The contents of shift register 60 ($Q_1 \ldots Q_N$) are also coupled to a memory portion 62. A sliding window length is used to access the continuous sector loading samples stored in memory portion 62. For example, a five-minute sliding window average would include 150 of the most recently stored continuous sector loading samples. The accessed memory portion 62 contents are then coupled into logic 64 wherein combination logic is formed to generate the sliding window average. As one of average skill in the art will recognize, shift register 60 and logic 64 are shown as separate devices for the purpose of discussion, although they may be formed as part of a larger integrated circuit containing additional devices. It should be understood that the 2-second samples are themselves averages of loading, and as such can be of different length, e.g. 4-second samples. Similarly, the sliding window described in the embodiment above is equal weight, and can be described as an FIR filter. The weights need not be equal, and the filter can be implemented in IIR format. That is, the more recent 2-second samples are given higher weight than the older samples. In IIR format, the output of the register depends on set of previous samples, the current sample, and a set of previous outputs. In FIR format, the output of the register depends on only a set of previous samples and the current sample.

Figure 4:
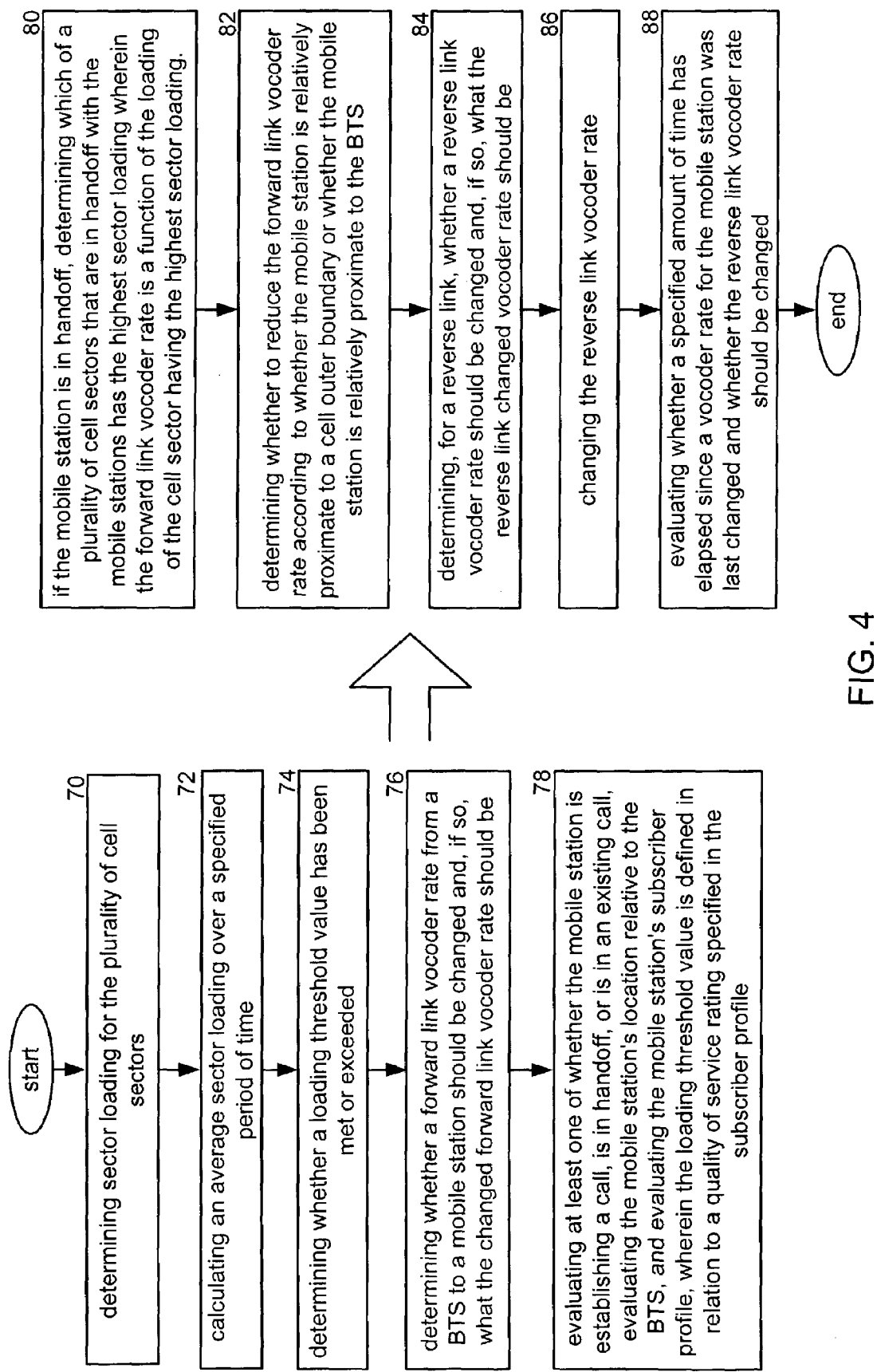
FIG. 4 is a flowchart illustrating one method of the present invention.

FIG. 4 is a flowchart illustrating one method of the present invention. A BSC determines sector loading for a plurality of cell sectors (step 70). In an alternate embodiment, the BTS may determine some or all of the sector loading. Based on a sliding window average, the BSC calculates average sector loading over a specified period of time (step 72). A loading threshold value is determined based on a blocking threshold for an assumed grade of service within the system. The BSC determines whether a sliding window average is equal to or greater than the loading threshold value (step 74). If the BSC determines the loading threshold value has been met or exceeded, it will determine if a forward link vocoder rate should be changed and, if so, what the forward link vocoder rate should be (step 76). Metrics to determine if the forward link vocoder rate should be changed include evaluating at least one of whether the mobile station is establishing a call, is in handoff, or is in an existing call, evaluating the mobile station's location relative to a BTS, and evaluating the mobile station's subscriber profile, wherein the loading threshold value is defined in relation to a quality of service rating specified in the subscriber profile (step 78). When a mobile station is in handoff, it is in communication with a plurality of cell sectors. The BSC will determine sector loading, for each sector that is in communication with the mobile station, reflecting the traffic in that sector. The BSC will set the forward link vocoder rate as a function of the sector loading of the cell sector having the highest sector loading (step 80). Since it is unknown when or if a sector will become the controlling sector, setting the forward link vocoder rate as a function of the highest sector loading will serve to maintain the transmitter output power at a lower level thereby improving network capacity.

The proximity of a mobile station to the BTS will affect the transmitter output power required to maintain the link with the mobile station. Mobile stations relatively close to the BTS do not require a lot of transmitter output power, therefore reducing the forward link vocoder rate will not have much impact on sector loading, whereas mobile stations at the edge of the cell boundary may require close to maximum power to maintain the link which greatly increases sector loading. Therefore, evaluating the mobile station location is another method for controlling the forward link vocoder rate. The forward link vocoder rate may be reduced for mobile stations relatively proximate to the cell outer boundary (which requires more transmitter output power) and not reducing the forward link vocoder rate for mobile stations relatively close to the BTS. Thus, the inventive method includes determining whether to reduce the forward link vocoder rate according to the proximity of the MS to the BTS (step 82).

A reverse link vocoder rate may also be evaluated to maintain network capacity. The BSC will determine, for a reverse link, whether a reverse link vocoder rate should be changed and, if so, what the reverse link vocoder rate should be (step 84). The reverse link vocoder rate is changed (step 86) after the BSC has determined the rate should be changed. Several methods are available to change the reverse link vocoder rate. The reverse link vocoder rate may be set as a function of the forward link vocoder rate. If the forward link vocoder rate is reduced from a first rate to a second rate then the reverse link vocoder rate may be reduced from a first rate to a third rate. That is, the forward and reverse link mode combinations are pre-determined based on analysis, field trials/experimentation, etc. The reverse link vocoder rate may also be set independently (of the forward link vocoder rate) as a function of a determined rise-over-thermal (ROT) value calculated by the BTS. As previously described, ROT is a measure of the reverse link loading and a downgraded reverse link vocoder rate will reduce reverse link loading. As part of controlling reverse link loading, the BSC evaluates whether a specified amount of time has elapsed since a vocoder rate for the mobile station was last changed and whether the reverse link vocoder rate should be changed (step 88). In addition, if the MS is in handoff, then the BSC determines which sector in communication with the MS has the highest measured ROT. This sector may then determine which reverse link SMV mode should be assigned to the MS.

Figure 5:
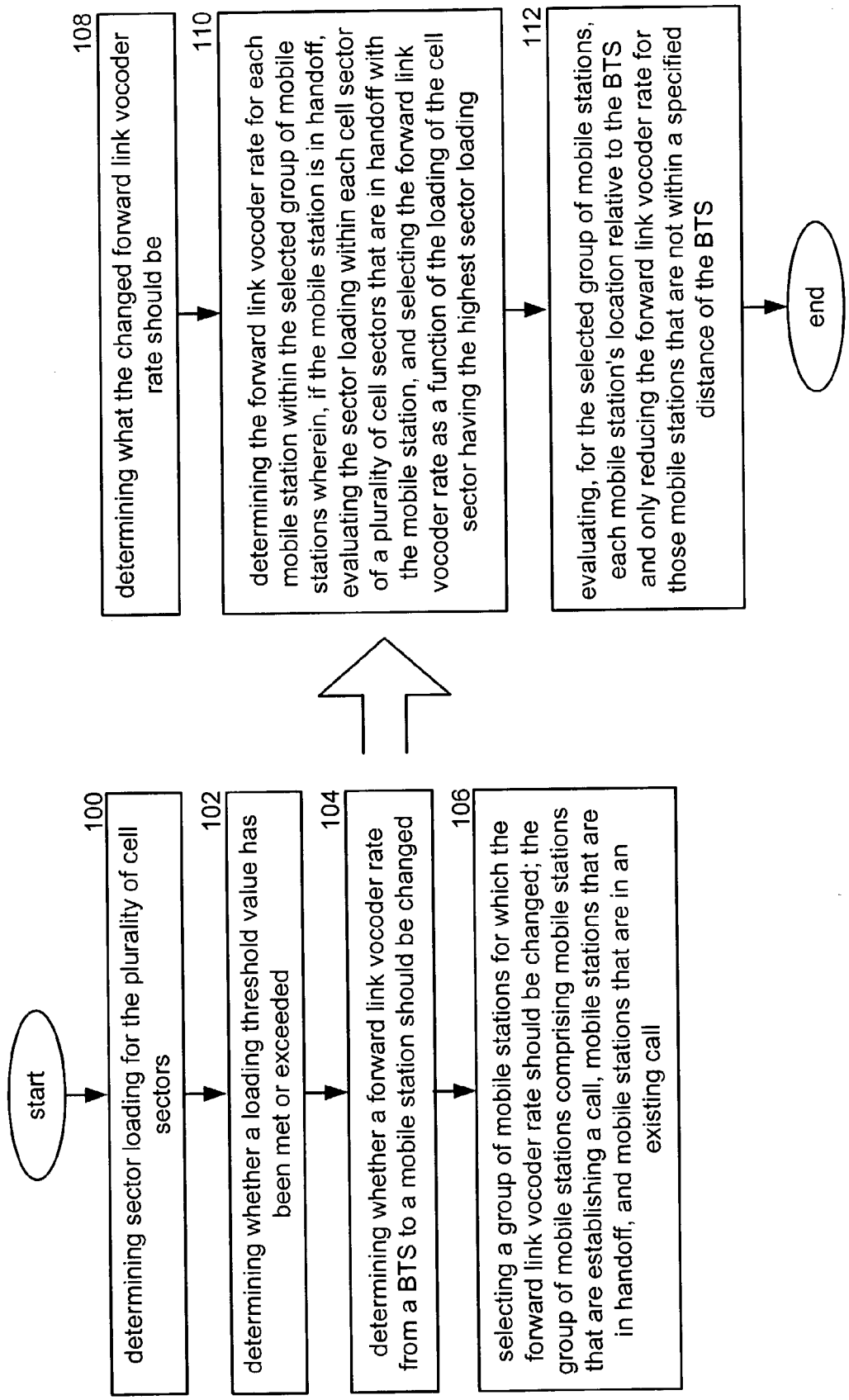
FIG. 5 is a flowchart illustrating one method of the present invention.

FIG. 5 is a flowchart illustrating one method of the present invention. A BSC determines the sector loading for the cell sectors (step 100). To determine sector loading, continuous sector loading samples (averaged over two-second intervals) generated by a BTS are stored in a shift register to form a first level average. Based on a sliding window average, the BSC calculates average sector loading over a specified period of time by calculating a second level average reflecting an average of the first level average. The BSC then compares the average sector loading to a loading threshold value determined by a blocking threshold for an assumed grade of service within the system. The BSC then determines whether the loading threshold value has been met or exceeded (step 102). If the BSC determines the loading threshold value has been met or exceeded, it will determine if a forward link vocoder rate from a BTS to a mobile station should be changed (step 104). This step includes evaluating the mobile station's proximity to the BTS and an amount of time since the vocoder rate was last changed. If it is determined that the forward link vocoder rate should be changed, the BSC selects a group of mobile stations for which the forward link vocoder rate should be changed. Groups of mobile stations considered for change include mobile stations that are establishing a call, mobile stations that are in handoff, and mobile stations that are in an existing call (step 106). For the selected group of mobile stations, the BSC will determine what the changed forward link vocoder rate should be (step 108).

When a mobile station is in handoff, it is in communication with several BTSs. Each sector of the BTS that is in communication with the mobile station will have sector loading reflecting the traffic in each sector. Each BSC will, through the BTS, set the forward link vocoder rate as a function of the sector loading of the cell sector, of the plurality of cell sectors, having the highest sector loading (step 110). Since it is unknown when or if a BTS sector will become the controlling sector, setting the forward link vocoder rate as a function of the highest sector loading, for the group of cell sectors in handoff communication with the mobile station, will serve to maintain the transmitter output power at a lower level thereby improving network capacity.

The proximity of a mobile station to the BTS will affect the transmitter output power required to maintain the link with the mobile station. Mobile stations relatively close to the BTS do not require a lot of transmitter output power, therefore reducing the forward link vocoder rate will not have much impact on sector loading, whereas mobile stations at the edge of the cell boundary may require maximum power to maintain the link which greatly increases sector loading. The BSC will evaluate the location of each mobile station, of the selected group of mobile stations, relative to the BTS. The forward link vocoder rate will be reduced for mobile stations that are not within a specified distance of the BTS (step 112).

Figure 6:
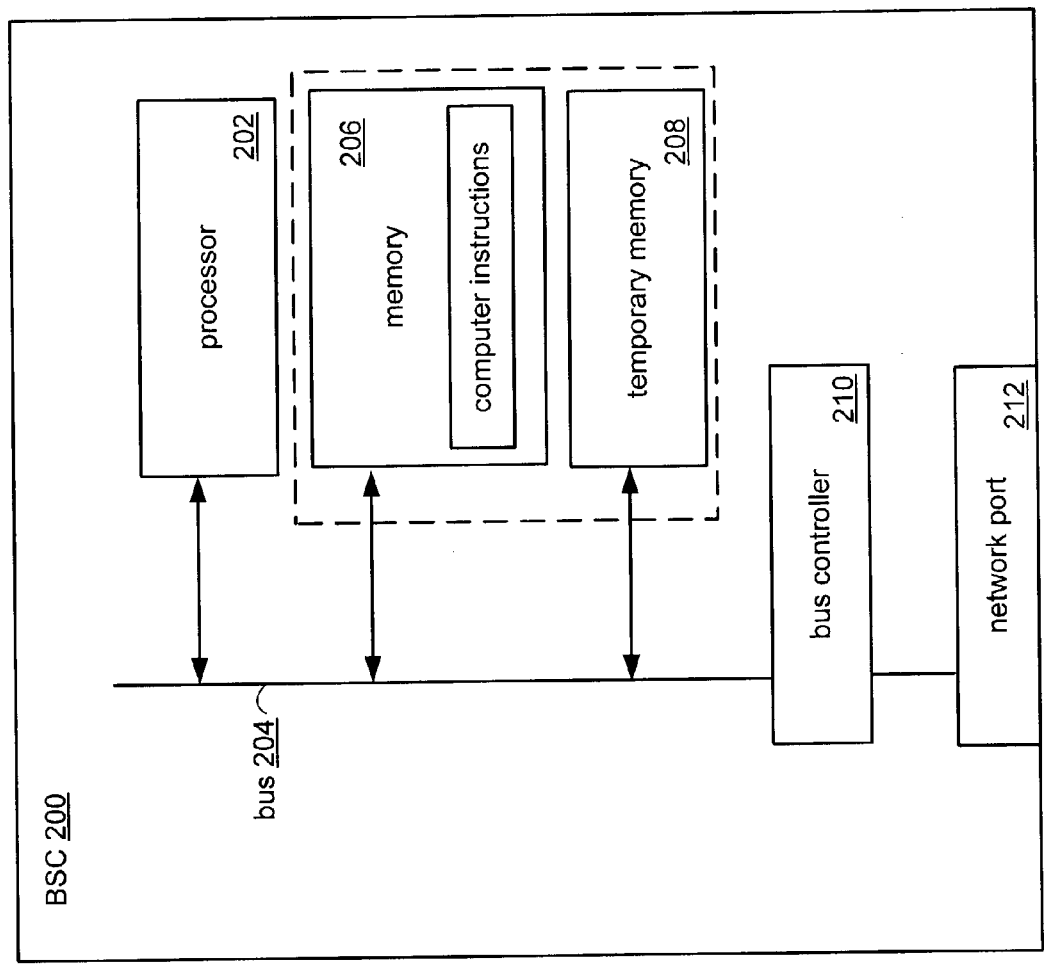
FIG. 6 is a functional block diagram of a base station controller formed according to one embodiment of the present invention.

FIG. 6 is a functional block diagram of a base station controller (BSC) formed according to one embodiment of the present invention. BSC 200 includes a processor 202 that is coupled to communicate over a bus 204. A memory 206 further is coupled to bus 204 and is for storing computer instructions that define the operational logic of BSC 200. A temporary memory 208 is also coupled to bus 204 to provide storage of data on a temporary basis for future access while BSC 200 is in an operational mode. Bus 204 further is coupled to a bus controller 210, which controls the communications and timing of communications thereon. Bus controller 210 is further coupled to a network port 212 that enables BSC 200 to communicate with external devices.

In operation, processor 202 communicates with memory 206 by way of bus 204 to retrieve computer instructions stored therein and to execute the computer instructions to operate according to the logic defined within the computer instructions of memory 206. Memory 206 specifically includes computer instructions that define the logic for adjusting the forward link and reverse link vocoder rate as has been described herein. Additionally, computer instructions stored in memory 206 define logic for calculating a loading metric, a blocking threshold, and a sliding window length.

Thus, for example, when BSC 200 accesses continuous sector loading samples generated by the BTS, computer instructions stored in memory 206 define logic that calculates average sector loading. The logic further calculates the loading metric based, in part, on the sliding window average. Processor 202 stores the loading metric within temporary memory 208.

Computer instructions stored in memory 206 determine whether the loading metric exceeds the blocking threshold. If the loading metric is greater than the blocking threshold, logic prompts processor 202 to reduce the forward link vocoder rate in a manner previously described. If the loading metric is less than the blocking threshold, the forward link vocoder rate is either left unchanged or increased. Based on the results of the forward link vocoder rate, logic defined in memory 206 will set the reverse link vocoder rate equal to or less than the forward link vocoder rate.

Figure 7:
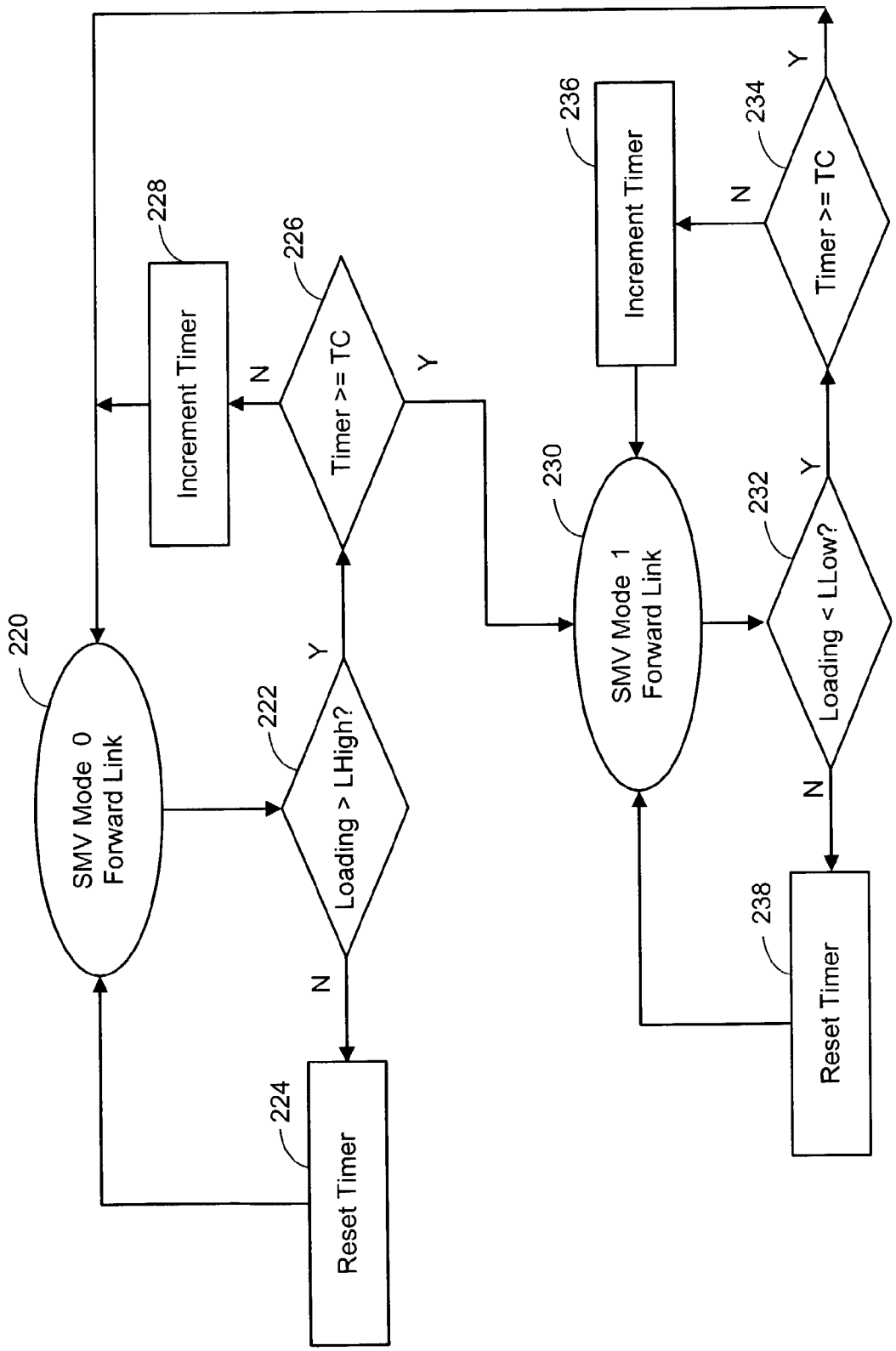
FIG. 7 is a flow chart of an alternate embodiment of the present invention.

FIG. 7 is a flow chart of an alternate embodiment of the present invention. This embodiment utilizes two loading thresholds to trigger vocoder downgrades and upgrades. In the example of FIG. 7, two SMV modes (0 and 1) are used for simplicity but it is understood that additional SMV modes can be supported by adding additional threshold levels. Though shown controlling the forward link only, it should be understood by one of average skill in the art that the same technique may be employed to control reverse link vocoder rates as well.

A BSC (not shown) monitors forward link loading in a plurality of BTS sectors operating in SMV mode 0 (step 220). Mode 0 reflects that all new calls will be set up with a first corresponding vocoder rate, for example, a preferred vocoder rate. As forward link loading increases, the loading value is compared to a defined high threshold, LHigh (step 222). In order to prevent excessive SMV mode changes, a timer is started when the loading exceeds the loading threshold. A specified period of time is defined such that the loading level must be greater than the loading threshold for a period of time as indicated by the timer that is greater than the specified period of time before triggering a SMV mode change. Accordingly, loading spikes are less likely to trigger the SMV mode change. If the loading is less than LHigh, the timer is reset (step 224) and the SMV mode remains at mode 0. If, however, the loading is greater than LHigh, the timer will be compared to the specified period (step 226). The timer value will be increment (step 228) if the timer is less than the specified period. If the timer is greater than the specified period (step 226, "Y"), the loading must be reduced so SMV downgrade to SMV mode 1 is initiated (step 230). Mode 1 reflects that all new calls will be set up with a second corresponding vocoder rate, for example, a reduced vocoder rate.

Once in SMV mode 1, the process operates similar to the SMV mode 0 process. The loading is compared to a low threshold, LLow (step 232). If the loading has been below LLow long enough, the timer will be greater than the specified period (step 234) so the SMV mode will be upgraded to SMV mode 0. Otherwise the timer will be either incremented (step 236) or reset (step 238).

The example of FIG. 7 uses one timer and one specified period for simplicity. System design may dictate different specified periods for SMV modes 0 and mode 1. More specifically, system design may desire less frequent downgrades and more frequent upgrades so the mode 0 TC may be set longer than the mode 1 TC. This case would require timers for both mode 0 and mode 1.

The process described is directed toward the CDMA network preferred embodiment. It is, however, applicable to UMTS as well.

The invention disclosed herein is susceptible to various modifications and alternative forms. Specific embodiments therefore have been shown by way of example in the drawings and detailed description. For example, the method and apparatus of the present invention has been described in terms of the BSC dynamically controlling selectable vocoder rates. One of average skill in the art will recognize that the controlling functions can be performed in the BTS or even in the MSC. Even in the case where it is performed in the BTS, however, the BSC will be required to advise the mobile station that it should change the reverse link vocoder rate and the manner of doing so (to make a corresponding change as described herein or to make a change according to rise over thermal levels). It should be understood that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method, in a cellular network having a base station controller (BSC), for adjusting vocoder rates in a cellular communication network including a plurality of cells, each of the plurality of cells having a plurality of cell sectors, the method comprising:
   determining average sector loading for the plurality of cell sectors;
   determining whether a loading threshold value has been met or exceeded wherein the loading threshold value is defined in relation to a quality of service rating specified in a subscriber profile;
   determining for a forward link from a base station (BTS) whether a forward link vocoder rate from the BTS to a mobile station should be changed and, if so, what the changed forward link vocoder rate should be by determining, if the mobile station is in handoff, which of a plurality of cell sectors that are in handoff with the mobile station has the highest sector loading wherein the forward link vocoder rate is a function of the loading of the cell sector having the highest sector loading; and wherein the step of determining whether to change the forward link vocoder rate to the mobile station includes:

evaluating whether the mobile station is establishing a call, is in handoff, or is in an existing call, evaluating the mobile station's location relative to the BTS wherein the vocoder rate is not adjusted for mobile stations closer to the base station than to a perimeter of the cell, evaluating the amount of time since the last time the vocoder rate was changed for the mobile station and evaluating the mobile station's subscriber profile for a quality of service rating.

2. The method of claim 1 further including determining, for a reverse link, whether a reverse link vocoder rate should be changed and, if so, what the changed reverse link vocoder rate should be.

3. The method of claim 1 further including changing the reverse link vocoder rate independently of the forward link vocoder rate based, at least in part, on a BTS determined rise-over-thermal value.

4. The method of claim 1 further including changing the reverse link vocoder rate as a function of the forward link vocoder rate.

5. The method of claim 4 wherein, if the forward link vocoder rate is reduced from a first rate to a second rate, the reverse link vocoder rate is reduced from the first rate to a third rate wherein the third rate is lower than the second rate.

6. The method of claim 1 wherein the forward link vocoder rate is reduced if the mobile station is relatively proximate to a cell outer boundary.

7. The method of claim 1 wherein the forward link vocoder rate is not reduced for a mobile station if the mobile station is relatively proximate to the BTS.

8. The method of claim 1 wherein the step of determining whether the loading threshold value has been met or exceeded includes calculating an average sector loading over a specified period of time using a sliding window structure that averages a constant number of loading values in a shift register type architecture.

9. The method of claim 1 wherein the step of determining whether to change the forward link vocoder rate to the mobile station includes evaluating the mobile station's subscriber profile wherein the loading threshold value is defined in relation to a quality of service rating specified in the subscriber profile.

10. The method of claim 1 further including evaluating whether a specified amount of time has elapsed since a vocoder rate for the mobile station was last changed.

11. A method, in a base station controller (BSC), for adjusting vocoder rates in a cellular communication network including a plurality of cells, each of the plurality of cells having a plurality of cell sectors, the method comprising:

determining sector loading for the plurality of cell sectors;

determining whether a loading threshold value has been met or exceeded wherein the loading threshold value is defined in relation to a quality of service rating specified in a subscriber profile;

determining whether a forward link vocoder rate from a BTS should be changed;

selecting a group of mobile stations for which the forward link vocoder rate should be changed wherein the group of mobile stations consist of mobile stations that are closer to a perimeter of the cell than to a base station wherein the group of mobile stations comprises mobile stations whose vocoder rate has not been changed for a specified amount of time;

determining what the changed forward link vocoder rate should be by determining the forward link vocoder rate for each mobile station within the selected group of mobile stations wherein, if the mobile station is in handoff, evaluating the sector loading within each cell sector of the plurality of cell sectors that are in handoff with the mobile station, and selecting the forward link vocoder rate as a function of the loading of the cell sector having the highest sector loading; and wherein the group of mobile stations comprises mobile stations that are establishing a call, mobile stations that are in handoff, and mobile stations that are in an existing call.

12. The method of claim 11 further including, for the selected group of mobile stations, evaluating each mobile station's location relative to the BTS and only reducing the forward link vocoder rate for those mobile stations that are not within a specified distance of the BTS.

13. A base station controller (BSC), comprising:
a bus;
a processor coupled to communicate over the bus;
a network port for coupling the BSC to a wireless communication network to enable the BSC to communicate with a base transceiver station (BTS); and
a memory coupled to the bus, the memory including computer instructions that define logic for:
calculating a loading metric;
calculating a loading threshold for all traffic in a cell sector wherein the loading threshold value is defined in relation to a quality of service rating specified in a subscriber profile;
determining whether the calculated loading metric exceeds the calculated blocking threshold; and
assigning a new forward link vocoder rate to at least one mobile station if the mobile station closer to a perimeter of a cell served by the base station than to the base station and if a specified period of time has elapsed since the vocoder rate was last changed and determining what the changed forward link vocoder rate should be including determining the forward link vocoder rate for each mobile station within the selected group of mobile stations wherein, if the mobile station is in handoff, evaluating the sector loading within each cell sector of the plurality of cell sectors that are in handoff with the mobile station, and selecting the forward link vocoder rate as a function of the loading of the cell sector having the highest sector loading.

14. The BSC of claim 13, wherein the computer instructions further define logic for determining a sliding window length.

15. The BSC of claim 13, wherein the loading metric is determined, in part, based on the sliding window average.

16. The BSC of claim 13, wherein the computer instructions further define logic for assigning a forward link vocoder rate if the loading metric is less than or equal to the blocking threshold, and assigning a reduced forward link vocoder rate if the loading metric is greater than the blocking threshold.

17. The BSC of claim 13, wherein the computer instructions further define logic for assigning a reverse link vocoder rate that is equal to or less than the forward link vocoder rate.

18. A method, in a cellular communication network including a plurality of cells, each of the plurality of cells having a plurality of sectors, for dynamically adjusting voice quality between a base station and a mobile station in a cell served by the base station, the method comprising:

defining a plurality of loading threshold values that correspond to quality of service ratings;

determining that at least one of the plurality of loading threshold values has been met or exceeded;

determining that a specified amount of time has elapsed since a vocoder rate has last changed to dynamically adjust voice quality;

determining that the vocoder rate should be changed only if the specified amount of time has elapsed since the vocoder rate was last changed and only if the mobile station is closer to a perimeter of the cell than to the base station; and determining a new vocoder rate and changing the vocoder rate to the new vocoder rate and determining the forward link vocoder rate for each mobile station within a selected group of mobile stations wherein, if the mobile station is in handoff, evaluating the sector loading within each cell sector of the plurality of cell sectors that are in handoff with the mobile station, and selecting the forward link vocoder rate as a function of the loading of the cell sector having the highest sector loading.

19. The method of claim 18 wherein the plurality of loading threshold values further includes at least one High Loading Threshold (HLT), the HLT defining a level at which the vocoder rate is downgraded to reduce voice quality.

20. The method of claim 18 wherein the plurality of loading threshold values further includes at least one Low Loading Threshold (LLT), the LLT defining a level at which the vocoder rate is upgraded to improve voice quality.

21. The method of claim 18 wherein the specified period of time is adequately long to filter out responses to transient loading values to reduce excessive vocoder rate changes caused by the transient loading values.

22. The method of claim 18 wherein the cellular communications network is one of a CDMA network and a UMTS based network.

* * * * *